(12) United States Patent
Anderson et al.

(10) Patent No.: US 8,777,758 B2
(45) Date of Patent: Jul. 15, 2014

(54) SYSTEM AND METHOD FOR MONITORING A COMPUTING ENVIRONMENT

(75) Inventors: Nicholas William Anderson, Reno, NV (US); Stewart Thoeni, Reno, NV (US); Kehl Thomas LeSourd, Reno, NV (US); James Michael Gray, Reno, NV (US); Randall Jason Tognoni, Sun Valley, NV (US)

(73) Assignee: IGT, Las Vegas, NV (US)

( * ) Notice: Subject to any disclaimer, the term of this patent is extended or adjusted under 35 U.S.C. 154(b) by 57 days.

(21) Appl. No.: 13/287,879

(22) Filed: Nov. 2, 2011

(65) Prior Publication Data

US 2013/0085001 A1 Apr. 4, 2013

Related U.S. Application Data

(60) Provisional application No. 61/541,883, filed on Sep. 30, 2011.

(51) Int. Cl.
*G07F 17/32* (2006.01)

(52) U.S. Cl.
USPC .......................................................... 463/47

(58) Field of Classification Search
None
See application file for complete search history.

(56) References Cited

U.S. PATENT DOCUMENTS

| 8,360,904 B2* | 1/2013 | Oleson et al. ................. 473/570 |
| 2011/0098112 A1* | 4/2011 | Leboeuf et al. ................. 463/31 |
| 2013/0005447 A1* | 1/2013 | Lutnick et al. ................. 463/25 |

* cited by examiner

*Primary Examiner* — Robert R Raevis
(74) *Attorney, Agent, or Firm* — Billion & Armitage—IGT

(57) ABSTRACT

A computer system includes an enclosure having a processor, a memory communicatively coupled to the processor, and an environment monitoring system therein. The enclosure environment monitoring system includes a temperature sensor, and an air quality sensor. The computer system also has an indicator responsive to certain conditions being sensed.

12 Claims, 8 Drawing Sheets

SYSTEM AND METHOD FOR MONITORING A COMPUTING ENVIRONMENT

TECHNICAL FIELD

Various embodiments described herein relate to a system and a method for monitoring a computer environment.

BACKGROUND

Computers are like many other machines. In many instances, computers need to be maintained periodically to keep them running at peak performance and to assure the longest possible life of the computer. In many instances, this includes software upgrades and periodic checks of the various components to make sure the components are working efficiently with the microprocessor and other components of the computer. Most people think of software maintenance when they think of computer maintenance. It should be pointed out that, like other machines, computers also benefit from physical maintenance. Physical maintenance is commonly provided on a calendar basis. After so many days, for example, a routine maintenance task is performed on a machine whether the machine needs it or not. Such schemes operate on the premise that typically the component may "go bad" at a particular time. If something goes awry early, it can result in downtime of a machine during a critical time. If something goes awry early, more expensive components of a computer can be worn out prematurely. For example, if a computer runs hot the components can undergo thermally cycling that shortens the life of a component. If the component is not bad when routine maintenance occurs, money was needlessly spent on the component and the labor for replacing the component.

Electronic gaming machines (EGM) include a computer which is used to control the machine. Inputs are provided by players. The computer outputs a game to entertain the players. A casino floor can include many electronic gaming machines. Poor air quality in a casino environment can have negative effects regarding the performance of electronic gaming machines. For example, poor air quality can cause contamination of air filters from smoke and dust in the casino. The filter can become so clogged that the fan associated with the electronic gaming machine fails to move cooling air into an enclosure containing the processor. The processor overheats and shuts down. This results in an immediate loss of revenue for the casino and also may negatively impact the casino's reputation if the electronic gaming machines are not up and running most of the time.

SUMMARY OF THE DESCRIBED EMBODIMENTS

An electronic gaming machine ("EGM") includes an enclosure. Within the enclosure is gaming circuitry. The gaming circuitry includes a computer system or parts of a computer system as well as other circuitry. Included within an enclosure, is a processor, a memory communicatively coupled to the processor, and an environment monitoring system therein. The environment monitoring system monitors the environment within the enclosure, and includes at least a temperature sensor, and an air quality sensor. The gaming circuitry also has an indicator for indicating a high temperature condition. In some embodiments, the computer system includes the indicator for indicating a high temperature condition. In one embodiment, the air quality sensor monitors a count of particulates in the air within the enclosure, the computer system includes an indicator for indicating a particulate count over a threshold particulate count. The EGM also includes an indicator for indicating a combination of a temperature over a threshold temperature and a particulate count over a threshold particulate count. The indicator is enabled when a maintenance action is required. In other embodiments, the indicator warns of an impending maintenance need and also indicates when there no maintenance need.

The indicator can take many forms. The indicator can enable a light when a maintenance action is required, or can enable one of several lights. The indicator can also generate an indication on an output device of a computer used to control the EGM. The computer within the EGM can be networked with other computers. In such a system, the indicator can be an update to a maintenance screen displayable on a computer screen of the EGM or of one of the computers networked with the EGM. The indicator on the maintenance screen can be at the computer of the EGM, or at a computer in a back room, such as a server networked with one or more EGMs. The maintenance screen may include a three light type of display. The maintenance screen may also include further information, such as current readings of the sensors associated with the EGM, or a history of one or more of the sensors within the enclosure of the EGM. The history can be displayed as a graph or as a table of information. The maintenance screen can include a trouble shooting guide or can have determined probable causes for the maintenance need. In some instances, the maintenance could display the maintenance action or actions needed. In addition, the display can include a history of the number of warning days that the machine owner ignored and other similar information that might be useful in determining responsibility for repair costs.

The electronic gaming system includes a fan positioned to produce a flow of incoming air to the enclosure. The incoming air also is filtered with an air filter. The second sensor, in one embodiment, monitors a count of particles in the air. The output of the temperature sensor and the output of the air quality sensor at a particular time is recorded in memory. This can be repeated at a plurality of times to produce a histogram of information. The histogram or stored information can be reviewed to detect patterns, for example, in the data. This in turn can be used to control a fan or other element of the machine or computer, such as a variable speed fan. In an alternative embodiment, the air filter can be monitored directly for particles to determine if the filter is clogged. In this embodiment, an indicator for indicating a need for a filter change is enabled in response to a count of particulates on the air filter being over a threshold number.

A method of monitoring an electronic gaming system for physical maintenance includes sensing the temperature of a portion of an electronic gaming system, sensing a particle count in an air volume associated with a portion of the computer electronic gaming system, and outputting a maintenance indication in response to combinations of sensed temperature and sensed particle count. In one embodiment, the sensing of the temperature includes sensing the temperature of a portion of a computer system associated with the electronic gaming system.

A computerized method includes sensing a temperature at a plurality of times in a volume in which at least one processor for an electronic gaming system is located, measuring air quality at a plurality of times in the volume in which at least one processor for the electronic gaming system is located, storing the sensed temperature and the measured air quality for the plurality of times, and controlling at least one component of the electronic gaming system in response to one or more sensed temperatures or one or more air quality measurements. For example, the electronic gaming system includes a fan. The fan is controlled in response to one or more sensed temperatures. The fan can also be controlled in response to one or more air quality measurements. Other elements that control the airflow into the electronic gaming system could also be controlled. The stored sensed temperatures and the measured air quality for the plurality of times can also be analyzed to detect a pattern which can be used as a basis to control one or more components of the electronic gaming system or specialized machine formed by the computer associated with the electronic gaming system. It should be noted that a group of computers, such as computers connected via a network, can exhibit similar patterns. This can be used to control components within one or more of the group of computers or specialized machines or electronic gaming machines. The detected patterns could be used to control devices external to the computer or specialized machine or electronic gaming machine. For example, the vents, plenums, and other portions of a heating ventilation and air conditioning for a casino floor could be controlled in response to detected patterns to direct more cooling air to a bank of devices, such as a bank of electronic gaming machines which are on a network with one another.

BRIEF DESCRIPTION OF THE DRAWINGS

The embodiments will be readily understood by the following detailed description in conjunction with the accompanying drawings, wherein like reference numerals designate like structural elements, and in which.

DETAILED DESCRIPTION

In the following paper, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

Figure 1:
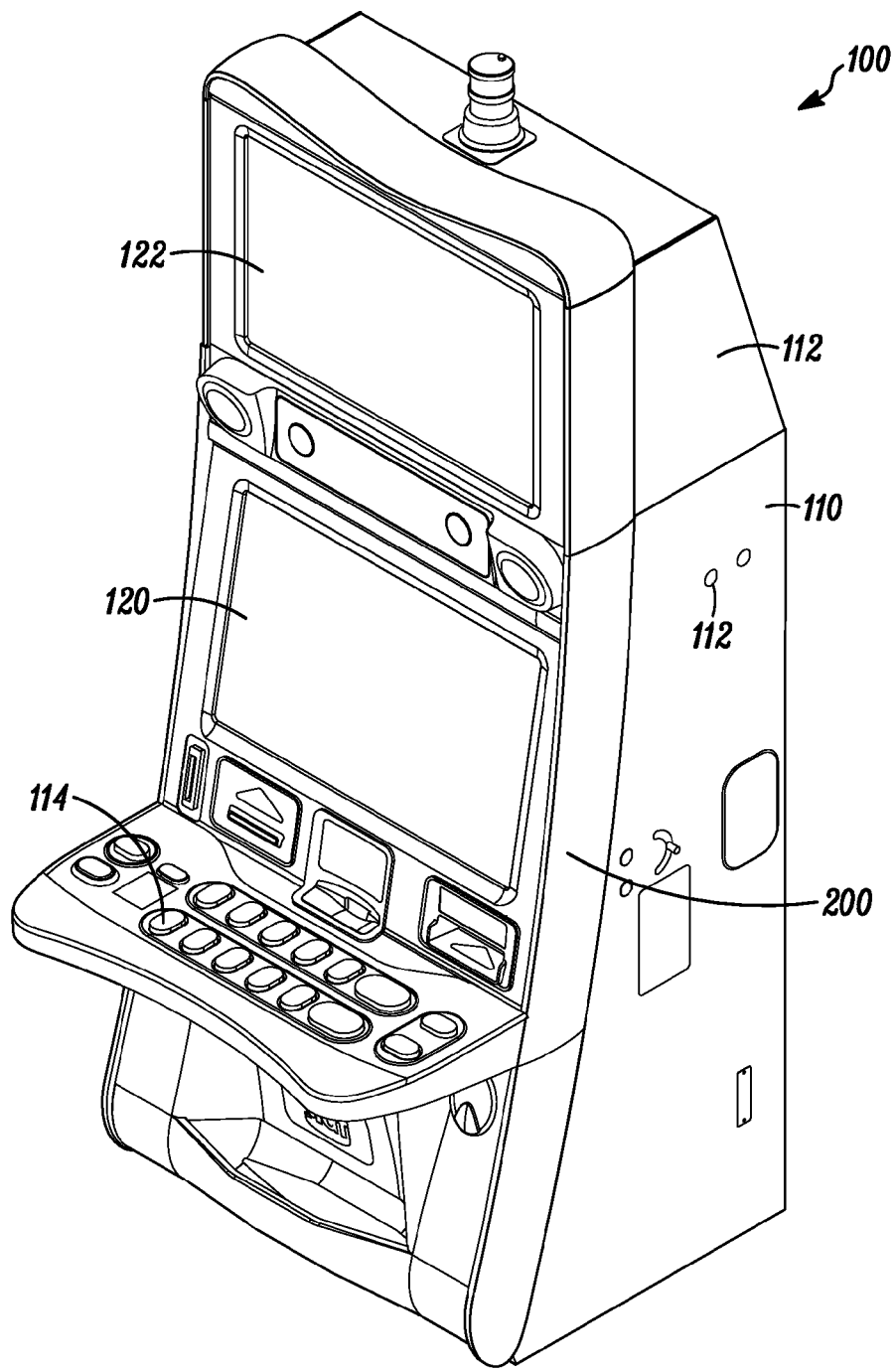
FIG. 1 is a perspective of a gaming machine that includes a cabinet which encloses the computer system, according to an example embodiment.
Figure 2:
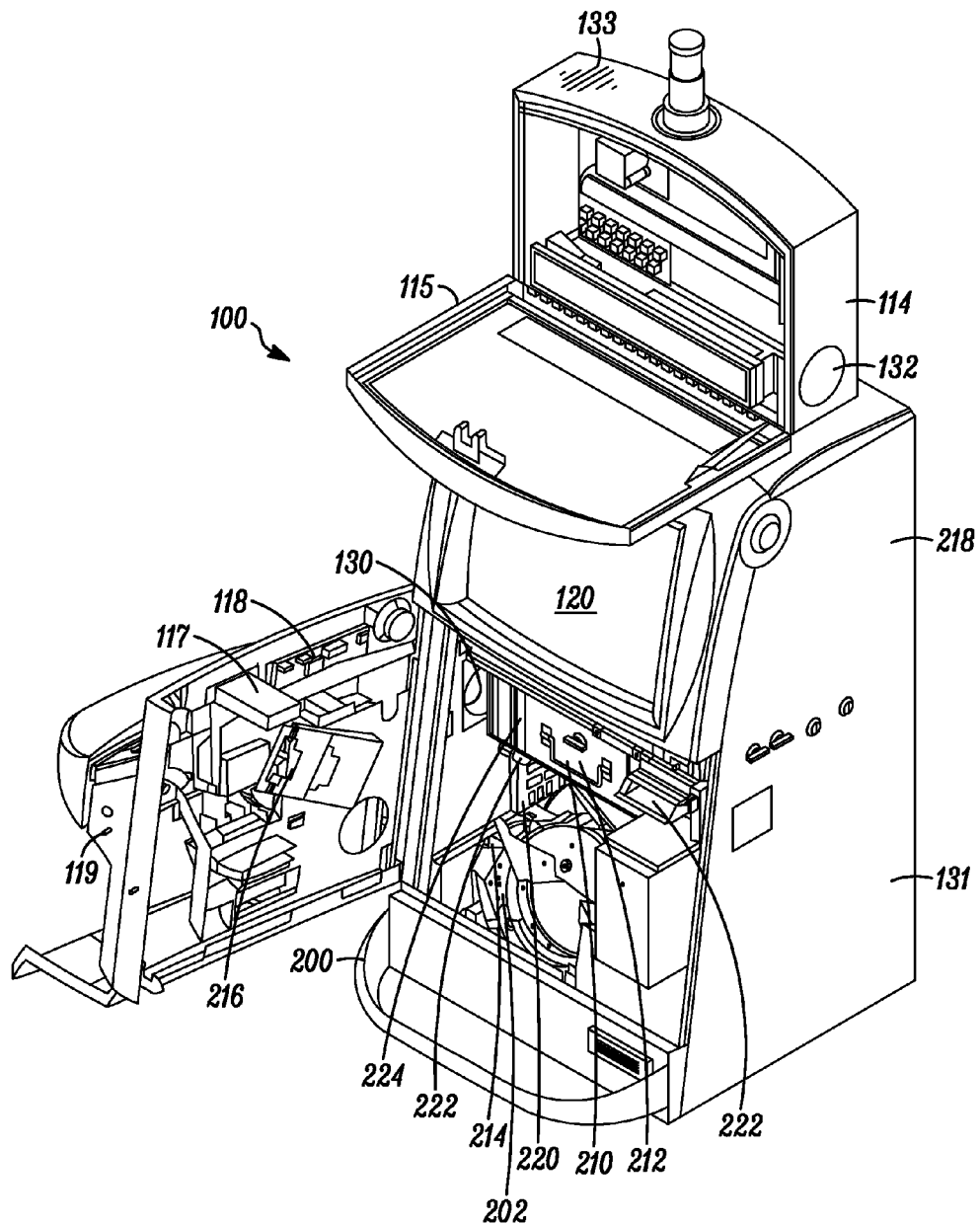
FIG. 2 is a perspective view of an open cabinet of a gaming system that includes an enclosure for a computer system, according to an example embodiment.

FIG. 1 is a perspective of an electronic gaming machine 100 that includes a cabinet enclosure 200 which encloses the computer system 2000 (shown in FIG. 8) and additional components which may or may not be coupled to the computer and under computer control, according to an example embodiment. The computer system 2000 and the additional components are referred to as gaming circuitry 202. FIG. 2 is a perspective view of the electronic gaming machine (EGM) 100 with doors open revealing the cabinet enclosure 200 and various components therein, according to an example embodiment. Now referring to both FIGS. 1 and 2, the EGM 100 and cabinet enclosure 200 will be further detailed. The gaming machine 100 includes a housing 110 which has a top box 112 and the cabinet enclosure 200. The housing 110 also includes a specialized keyboard 114, which is also termed a player switch panel or player input/output device and which is attached to a door 116 to the cabinet enclosure 200. The door 116 is opened to reveal the cabinet enclosure 200 of the housing 110. The first monitor 120 is mounted in the door 116 along with a card reader 117, a player tracking display 118 and a door latch 119. Of course, other components are or can be attached to the door 116. The top box 112 includes a top box door 115 and a second monitor 122. The second monitor 122 is also attached to the top box door 115. The first monitor 120 displays many of the main aspects of the game as the game is played. The user interacts mainly with the first monitor 120 during game play. The second monitor 122 can also display some of the aspects of the game as played. Both monitors display graphics for attracting players while the game is not being played. The top box 112 also includes some components such as a power distribution board 121. The cabinet enclosure 200, as shown by FIG. 2, carries many more components than the top box 112.

Many computer components are within the cabinet enclosure 200. There are also components within the cabinet enclosure 200 that may or may not be under the control of the host computer. The cabinet enclosure 200 includes a central processor 210 on a mother board 212, a communication board assembly 214, an input/output board 216, a power supply 218, and a DC communication board assembly 214, an input/output board 216, a power supply 218, and a DC distribution board assembly 220. Some of these components are for a typical computer system, such as the one described below in FIG. 8. The cabinet enclosure 200 includes a bill acceptor assembly 222, a service lamp 224, a reset/operator switch 224, a hopper 226 and other components that are not part of the computer system 900 (shown in FIG. 9) but are part of the EGM 100.

The housing 110 also includes vent openings 130 and 131 for which form a flow path through the cabinet enclosure 200. The housing also includes vent opening 132 and 133 which form an air flow path through the top box 112. The vent openings 130, 131, 132, 133 are generally on the sides and back of the computer or EGM and form one or more air flow paths through the housing and more specifically through an incoming vent, the enclosure, and an outgoing vent. The computer also includes a fan (310 of FIG. 3) which is positioning within the air flow path. The fan 310 is an air handler for increasing the air flow through the housing 110 and past the components that produce heat during operation. The fan is sized to move a volume of air through the cabinet enclosure 200 and through the top box 112 that can remove an amount of heat from the various heat generating components associated with the computer or EGM to keep the temperature within the enclosure 200 and the top box 112 down at a level where components will not wear out prematurely due to thermal cycling of the components. In one embodiment, a fixed fan 310 may be used. In another embodiment, a variable speed fan 310 can be used. The variable speed fan 310 can be controlled to reduce air flow during times when the components within the cabinet enclosure 200 and the top box 112 are not being used or are in a low usage state. During such time, less air flow is needed to remove heat. Fans running at a slower speed also are not as noisy. The variable speed fan 310 can also run or be controlled to reduce power consumption. In some embodiments, a plurality of factors, such as the three listed above, can be analyzed and the result of the plurality of factors can be used to control the variable speed fan 310. In other embodiments, several EGMs are networked with one another, and so one or more factors for two or more EGMs can be analyzed and used to control various variable speed fans associated with the EGMs.

Figure 3:
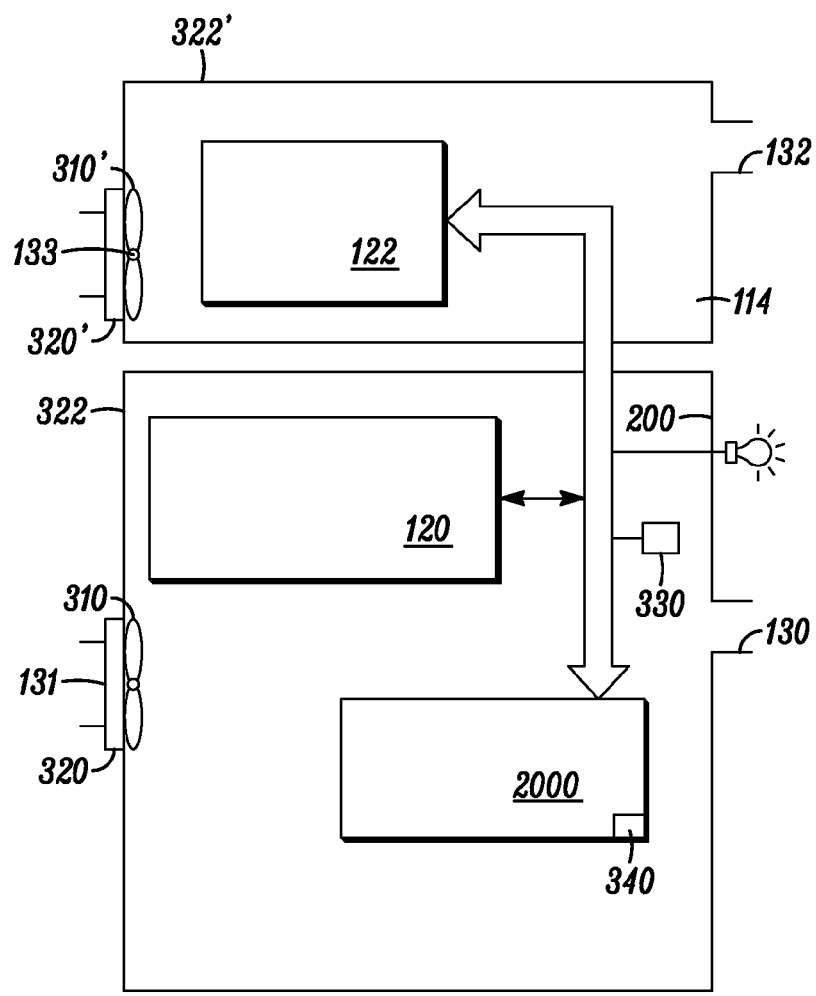
FIG. 3 is a schematic view of a computer system within an enclosure, according to an example embodiment.

FIG. 3 is a schematic view of electronic gaming circuitry 202 within an enclosure, according to an example embodiment. The electronic gaming circuitry 202 includes a computer system 2000. The computer system 2000 includes monitors 120 and 122. The EGM 100 has the cabinet enclosure 200 as well as the top box 112. As shown in FIG. 3, the monitor 120 is within the cabinet 200 and the monitor 122 is associated with the top box 112. Both of the monitors 120, 122 are one type of video display (2010 of FIG. 8). The cabinet enclosure 200 includes the gaming circuitry 202 which includes computer system 2000 which is communicatively coupled to the monitor 120 and the monitor 122. The vents 130 and 131 are shown for the cabinet enclosure 200 and the vents 132, 133 are shown for the top box 112. The cabinet enclosure 200 also includes an air handler or fan 310. In one embodiment, the air handler or fan 310 is capable of producing an adequate air flow in both the cabinet enclosure 200 and the top box 112. In another embodiment, another air handler or fan 310' is provided for the top box 112. The air handler or fan 310, 310' moves air through the cabinet enclosure 200 and through the top box 112. A filter 320 is provided in the air flow path through the cabinet enclosure 200. A filter 320' is provided in the air flow path through the top box 112.

The cabinet enclosure 200 and the top box 112 can also be provided with alternate venting elements 322, 322' which can be moved or controlled to set up an alternative air flow. These can be moved to set up a bypass air flow path under certain conditions. Although only one opening is shown, the alternative venting elements can be one or more alternate paths with one or more directional flaps for setting up various air flow paths. For example, if a filter becomes obscured or clogged, the air flow path within the cabinet enclosure 200 can be disrupted. The temperature within the cabinet enclosure 200 can rise to a point where the processor, such as processor 210 must shut down. To avert this, the alternate venting elements 322, 322' can be employed to set up a bypass route so that an alternate air flow route is established to cool the processor 210. This could be used to prevent a processor failure, for example, or failure of other components within the cabinet enclosure.

Inside the cabinet enclosure 200 is a monitoring system or maintenance monitoring system 350 which includes a temperature sensor 340 and an air quality sensor 330. The air quality sensor 330 can be a particle counter which counts particles in the air within the cabinet enclosure 200. Other types of air quality sensors can be used as well. In one embodiment, the temperature sensor 200 could be a temperature sensor that exists already with respect to a microprocessor. For example, in Intel® processors one of the busses includes a temperature sensor to determine the temperature of the processor and prevent failure due to thermal overload or getting too hot.

The monitoring system or maintenance monitoring system 350 can be used in one of several configurations. The various configurations are shown using EGMs as examples. It should be noted, that any type of computer, such as a personal computer, workstation or the like could be similarly configured. Examples of the various configurations will now be further detailed.

Figure 4:
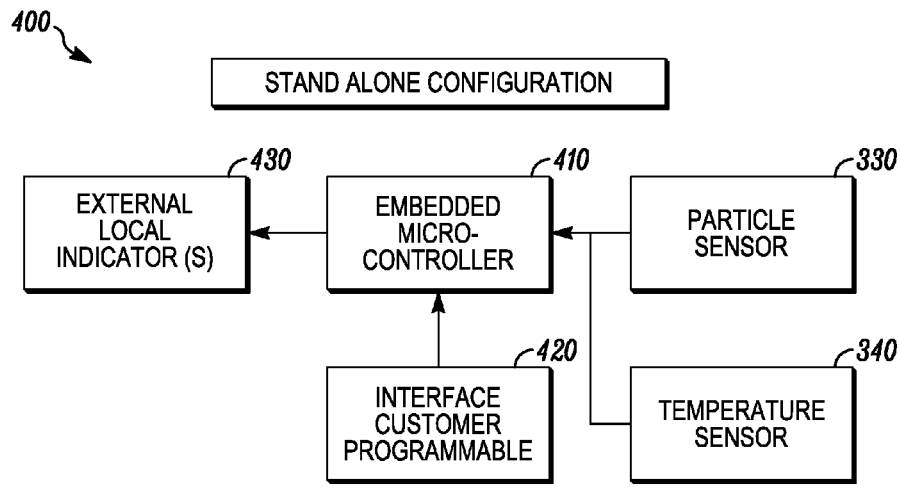
FIG. 4 is a schematic diagram of a stand alone configuration, according to an example embodiment.

FIG. 4 is a schematic diagram of a stand alone configuration, according to an example embodiment. The stand alone configuration includes an embedded microcontroller 410 receiving data from a particle sensor 330 and a temperature sensor 340. The thresholds for the microcontroller 410 are programmable by the customer through a programmable interface 420. When the thresholds for the temperature or particle count are met, the microcontroller 410 uses an external local indicator 430. In one embodiment, the external local indicator 430 is a signal light that communicates when filter service is required or a heat related event has occurred. This signal light could indicate levels of effective filtration area of the filter itself. The signal light could emit a green to indicate that a high percent open filter 320, 320' or media area. The signal light could emit a yellow light meaning medium percent open media area is present and that the filter will need changing in the near future. The signal light could emit red light indicating a low percent media area is open and that the current filter or filters 320, 320' will need to be replaced. The red, yellow, green approach simplifies the data into a visual expressive communication to the slot technician. Furthermore, the red, yellow, green approach is universal to understand. In another embodiment, the external local indicator 430 could be a radio frequency (RF) emitter. A service technician can carry an RF reader and receive RF signals from the external local indicator 430 indicative of various conditions of various EGMs or computers. Various RF emitters can include an identification code unique to a particular emitter or EGM.

Figure 5:
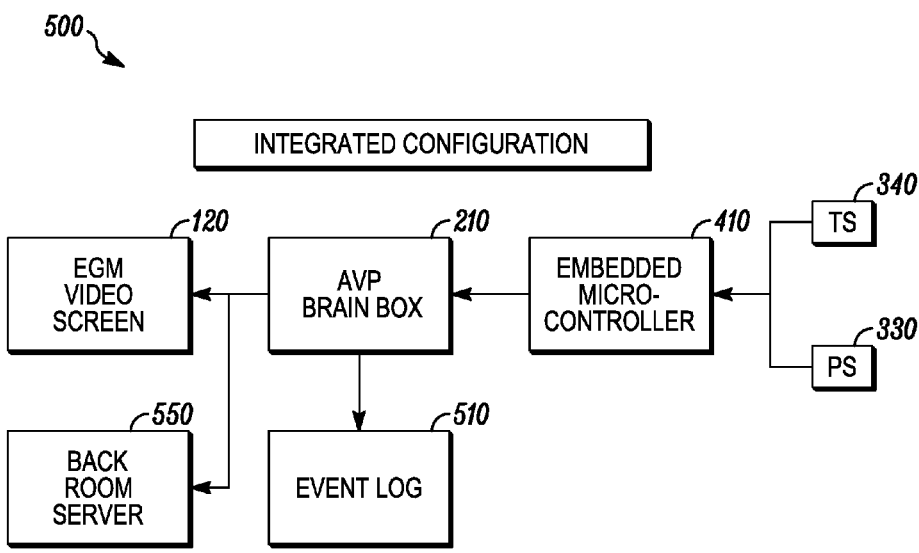
FIG. 5 is a schematic diagram of an integrated configuration, according to an example embodiment.

FIG. 5 is a schematic diagram of an integrated configuration 500, according to an example embodiment. The integrated configuration uses the same embedded microcontroller 410 communicatively coupled to a central processing unit 210. In addition to a signal light or in lieu of a signal light, the data is routed to the EGM video screen 120, or to a back room server 550. The events are recorded in an event log 510 for communicating when service is required.

Figure 6:
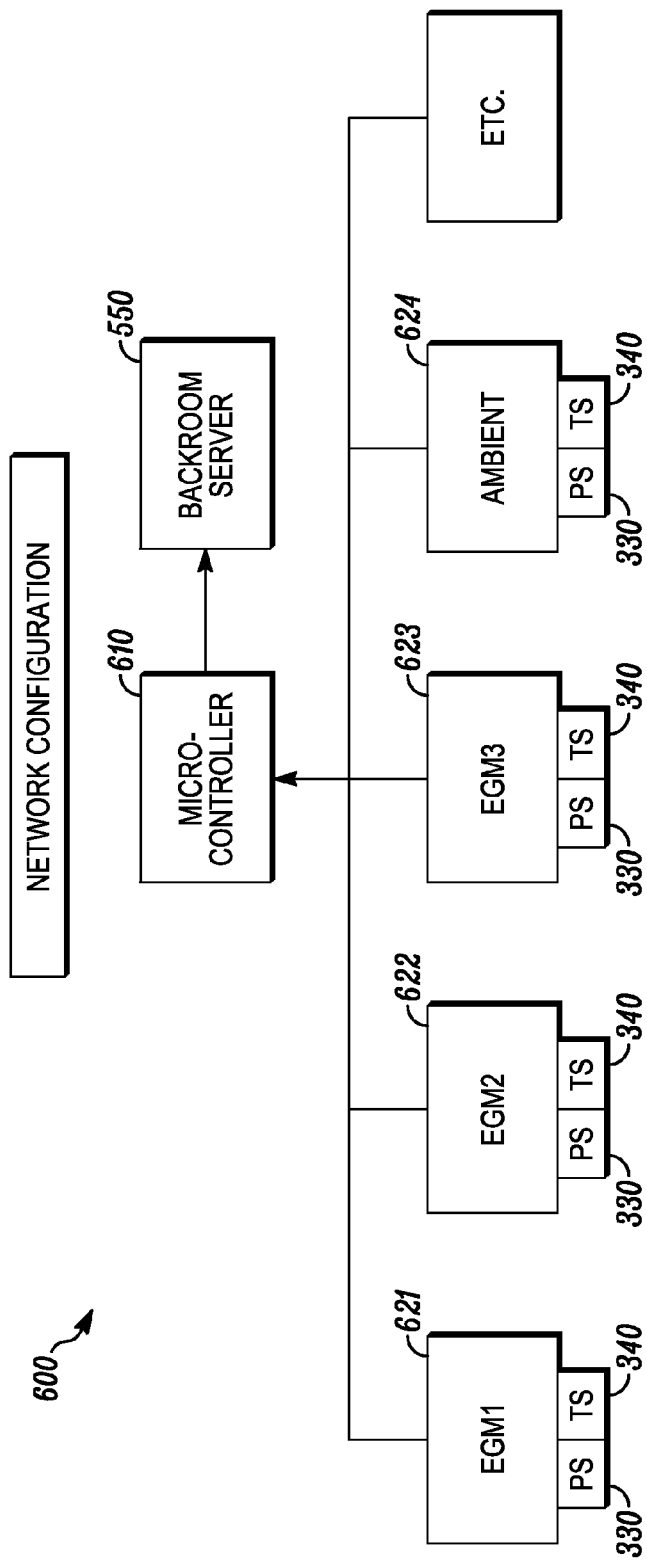
FIG. 6 is a schematic diagram of a network configuration, according to an example embodiment.

FIG. 6 is a schematic diagram of a network configuration 600 of a plurality of EGMs 621, 622, 623, according to an example embodiment. The network configuration 600 uses the particle sensors 330, and temperature sensors 340 in the EGMs 621, 622, 623 to route real time data to a remote microcontroller 610 which, in turn, communicates with the back room server 550. This configuration allows the customer to monitor system performance and schedule maintenance at a future date. In addition, a set of ambient sensors, such as ambient sensor 624, can be added to the configuration which will allow the customer to further diagnose filtration/cooling problems. For example:

$P_{amb} > P_{egm}$ and Temp is good . . . filter is installed and working properly.

$P_{amb} > P_{egm}$ and Temp is high . . . filter is clogged.

$P_{amb} = P_{egm}$ and Temp is good . . . filter is missing or misinstalled.

Figure 7:
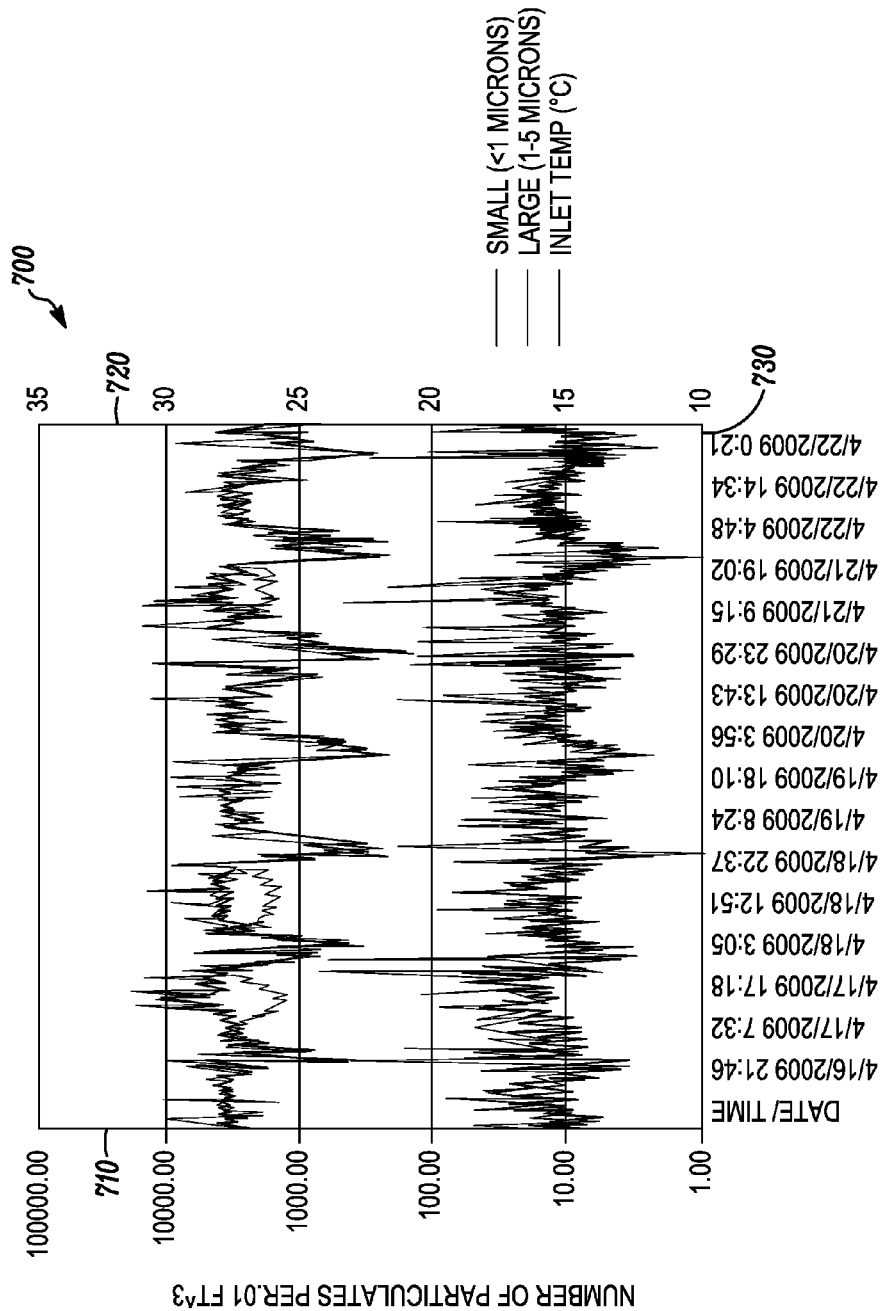
FIG. 7 is a graph showing particle count and temperature as a function of time, according to an example embodiment.

FIG. 7 is a graph 700 showing particle count and temperature as a function of time, according to an example embodiment. Data gathered and stored in an event log, such as event log 510 (see FIG. 5) or on a server 550 (shown in FIGS. 5 and 6) can be graphed and reviewed for patterns. FIG. 7 shows a graph that includes a particle count on y-axis 710 and shows temperature on y-axis 720 over time on the x-axis 730. The data shown was collected over a one week period on site at a casino. The graph 700 shows the fluctuation of particulates and heat over that time. Patterns can be detected from the information and used to control a particular EGM, for example. In addition, the data from groups of machines on a casino floor can also be analyzed to determine patterns that can be useful in making determinations about the machines, the casino environment, and the like. Groups of machines or EGMs can be networked or linked in a network to one another as well as to additional computers, such as a back room server. In one embodiment, the network connections are done in a peer-to-peer manner, where the EGMs share CPU resources (such as microprocessors serving as CPUs) across the network s so that some or all of the machines associated with the EGMs act as servers and share files with some or all of the other computing devices on the network. In another embodiment, the EGMs and other associated computers are connected in a network. The network includes an operating system in client and server machines, the cables connecting the machines, and the supported hardware in between, such as bridges, routers and switches. In some embodiments, the network is wireless so the network also includes antennas and towers. In the most general sense, a network is any arrangement of elements that are interconnected.

At the very least, monitoring the temperature and the particle levels provides owners of EGMs or other computers to have improved visibility on filter maintenance and potential cooling problems. The information is a predictive maintenance tool that reduces machine downtime due to unnecessary maintenance of filters, such as filters being replaced on a preventative maintenance schedule before it is necessary. The maintenance tool also can prevent or substantially minimize downtime due to machine shutdown from overheating. Both of these scenarios provide a distinct advantage in keeping EGMs or other computers up and running and generating revenue.

Many casinos use routine maintenance to service one or more machines. When routine maintenance is used, some machines can be serviced before they need to be and others are serviced after they need to be. A routine maintenance plan can cost the owners of a number of EGMs on a casino floor extra money. As an example, a casino has put all of their machines on a 90 day filter maintenance schedule. If a filter needs servicing after being exposed to 3000 particulates per cubic meter for a duration of 90 days and the air quality in the casino rises to 3500 particulates per cubic meter on average due to increased traffic, construction, etc., then the monitor would signal for service at 77.14 days avoiding a potential overheat/shutdown situation. Conversely, if the air quality improved on average to 2500 particulates per cubic meter possibly due to reduced traffic or recent servicing of air systems in the casino, the monitor would signal at 108 days saving the casino unnecessary downtime on the machine for maintenance. The temperature logger used in conjunction with the particle counter would signal if heat conditions reached threshold values. This condition could be caused by clogged filters, blocked ventilation holes, rise in ambient air temperature, or other maintenance problems. By indicating a need for service or maintenance, potential shutdown and/or damage to electronic components can be averted, saving the casino or machine owner money from reduced downtime or the need to replace expensive components of the EGMs.

A history log of frequency of maintenance per machine location could be useful to the casino floor manager in predicting air quality of their casino floor. This information could help determine future HVAC design, floor layout and predict high traffic areas. This type of information could also be used in marketing their casino over their competitor's casino as a more "green" friendly environment.

Analytics could be applied to the historic data to produce a predictive model for a particular casino floor or for casinos in general. In addition, specific historic data could also be used to predict maintenance needs in advance. For example, historic data associated with specific conventions or fights hosted by a casino hotel could be used to predict maintenance needs for an upcoming fight or convention. Such events would shorten the maintenance time for the machines, and a number of filters could be ordered earlier than normal so that the casino was not caught short after an event.

The time and date stamp history log is valuable information to owners of EGMs because of the advantages of being able to see how long a machine has remained running in a clogged or semi clogged condition. This information is useful in future development of products and will help communicate back to the customer the value of the preventive maintenance cycle.

Figure 8:
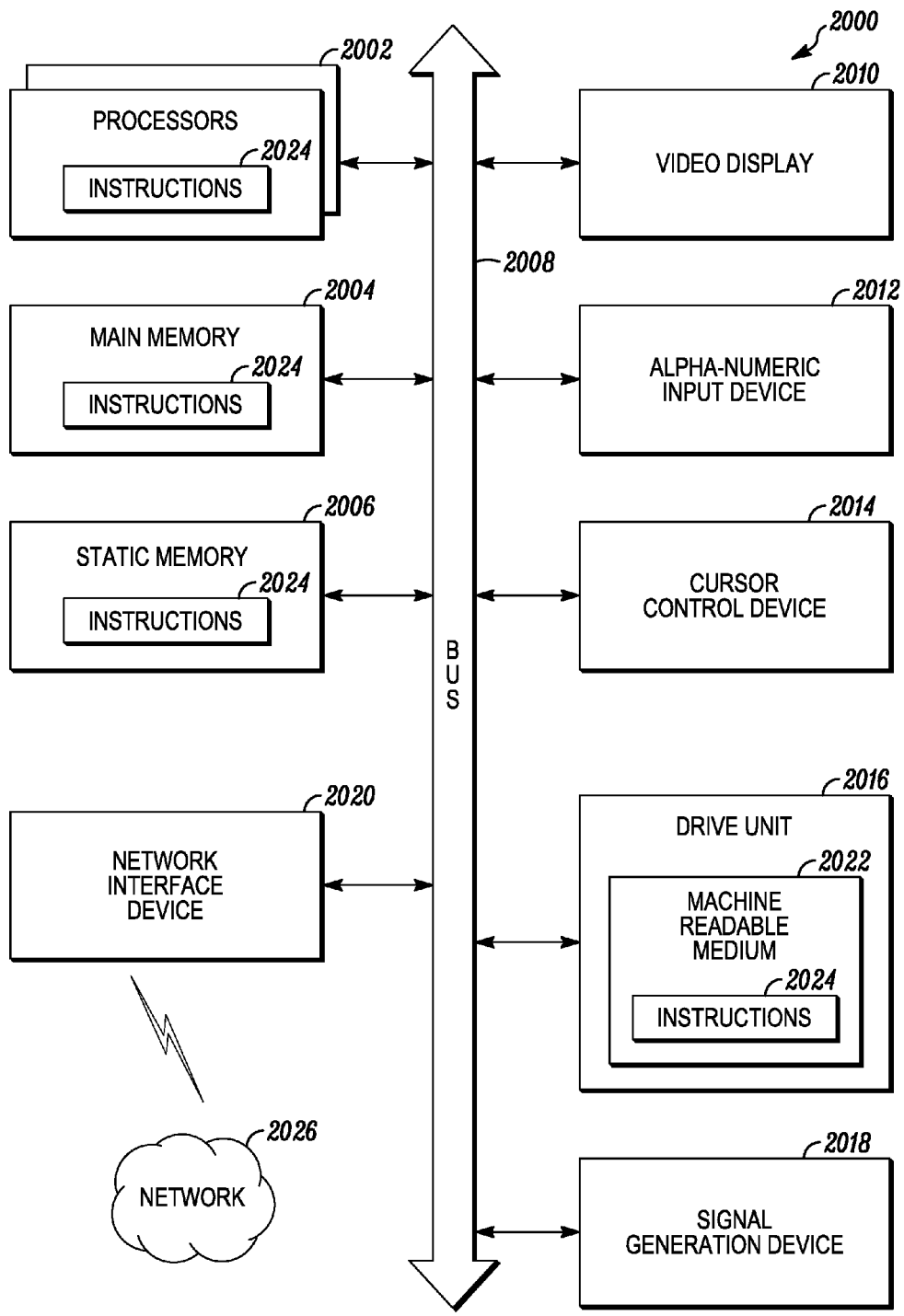
FIG. 8 shows a schematic diagram of a computer system used in the gaming system, according to an example embodiment.

As mentioned above, the invention is equally applicable to all computing systems. The examples discussed above are related to EGMs which are specialized machines for gaming. FIG. 8 shows a diagrammatic representation of a computing device for a machine in the example electronic form of a computer system 2000, according to another example embodiment. In various example embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a Personal Digital Assistant (PDA), a cellular telephone, a portable music player (e.g., a portable hard drive audio device such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2000 includes a processor or multiple processors 2002 (e.g., a central processing unit (CPU), a graphics processing unit (GPU), arithmetic logic unit or all), and a main memory 2004 and a static memory 2006, which communicate with each other via a bus 2008. The computer system 2000 can further include a video display unit 2010 (e.g., a liquid crystal displays (LCD) or a cathode ray tube (CRT)). The computer system 2000 also includes an alphanumeric input device 2012 (e.g., a keyboard), a cursor control device 2014 (e.g., a mouse), a disk drive unit 2016, a signal generation device 2018 (e.g., a speaker) and a network interface device 2020.

The disk drive unit 2016 includes a computer-readable medium 2022 on which is stored one or more sets of instructions and data structures (e.g., instructions 2024) embodying or utilized by any one or more of the methodologies or functions described herein. The instructions 2024 can also reside, completely or at least partially, within the main memory 2004 and/or within the processors 2002 during execution thereof by the computer system 2000. The main memory 2004 and the processors 2002 also constitute machine-readable media.

The instructions 2024 can further be transmitted or received over a network 2026 via the network interface device 2020 utilizing any one of a number of well-known transfer protocols (e.g., Hyper Text Transfer Protocol (HTTP), CAN, Serial, or Modbus).

While the computer-readable medium 2022 is shown in an example embodiment to be a single medium, the term "computer-readable medium" should be taken to include a single medium or multiple media (e.g., a centralized or distributed database, and/or associated caches and servers) that store the one or more sets of instructions and provide the instructions in a computer readable form. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, tangible forms and signals that can be read or sensed by a computer. Such media can also include, without limitation, hard disks, floppy disks, flash memory cards, digital video disks, random access memory (RAMs), read only memory (ROMs), and the like.

The example embodiments described herein can be implemented in an operating environment comprising computer-executable instructions (e.g., software) installed on a computer, in hardware, or in a combination of software and hardware. Modules as used herein can be hardware or hardware including circuitry to execute instructions. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method(s) can be written in any number of suitable programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

The above described invention could be used in EGMs or even in the computer system 2000. The computer system or parts of it can be included within an enclosure having a processor, a memory communicatively coupled to the processor, and an environment monitoring system therein. The enclosure environment monitoring system includes a temperature sensor, and an air quality sensor. The EGM or computer system also has an indicator for indicating a high temperature condition. In one embodiment, the air quality sensor monitors a count of particulates in the air within the enclosure, the computer system includes an indicator for indicating a particulate count over a threshold particulate count. In one embodiment, the computer system or EGM includes an indicator for indicating a combination of a temperature over a threshold temperature and a particulate count over a threshold particulate count. The indicator is enabled when a maintenance action is required. In other embodiments, the indicator warns of an impending maintenance need and also indicates when there no maintenance need.

The indicator can take many forms. The indicator can enable a light when a maintenance action is required, or can enable one of several lights. For example, the indicator can include a set of lights such as a red light for an immediate need for maintenance or indication that the computer system is stopped or shut down. The set of lights can include a yellow light warning that there is a need in the near term for maintenance, and a green light indicating that there is no need for maintenance at this time. The indicator can also generate an indication on an output device of the computer or EGM. For example, the indicator can be an update to a maintenance screen displayable on a computer screen. The indicator on the maintenance screen can be at the computer system itself, or at a server computer not generally seen by other than maintenance personnel. If on the computer itself, the maintenance screen may not be displayed to general users, but only to maintenance personnel. The maintenance screen may include a three light type of display. The maintenance screen may also include further information, such as current readings of the sensors associated with the computer or the EGM, including the sensors within the enclosure of the computer or the EGM. The maintenance screen can include a trouble shooting guide or can have determined probable causes for the maintenance need. In addition, the display can include a history of the sensor readings, and the number of warning days that the machine owner may have ignored, and the like.

The computer system or EGM includes a fan positioned to produce a flow of incoming air to the enclosure. The incoming air also is filtered with an air filter. The second sensor, in one embodiment, monitors a count of particles in the air. The indicator indicates a need for the air filter to be changed. For example, the filter may be torn which would cause the particle count of the incoming air and the air within the enclosure to be above a threshold value. In other words, when the particle count climbs, the filter is not doing its job. The output of the temperature sensor and the output of the air quality sensor at a particular time is recorded in memory. This can be repeated at a plurality of times to produce a histogram of information. The histogram or stored information can be reviewed to detect patterns, for example, in the data. This in turn can be used to control a fan or other element of the computer. The data can be stored at random times, such as a random sample, or can be stored at particular time intervals. The outputs from the temperature sensor and the air quality sensor are used to control the fan. In some embodiments, the fan is a variable speed fan so the speed of the fan can be controlled based on conditions and also based on need. For example, during times where it is determined that there may be clean air and little use of computing resources, the fan speed can be reduced to save energy and reduce noise since there is less need to cool the computer or filter the incoming air. For example, in a gaming situation, a computer or electronic gaming machine (EGM) will have a reduced amount of use in the early morning hours. By the same token, if there is given time when the particle count spikes, a variable speed fan could be run at higher speeds to remove particles from the incoming air. For example, if carpets are cleaned at a certain time during the week near an EGM, the fan speed can be ramped up to filter the incoming air to remove the particles during that time.

In an alternative embodiment, the air filter can be monitored for particles to determine if the filter is clogged. In this embodiment, an indicator for indicating a need for a filter change is enabled in response to a count of particulates on the air filter being over a threshold number.

Figure 9:
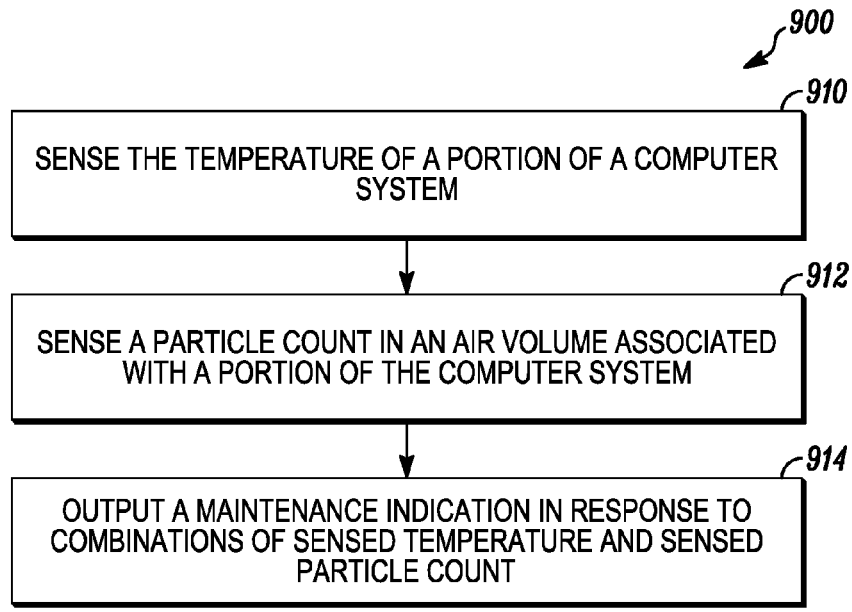
FIG. 9 is a flow diagram of a method of monitoring, according to an example embodiment.
Figure 10:
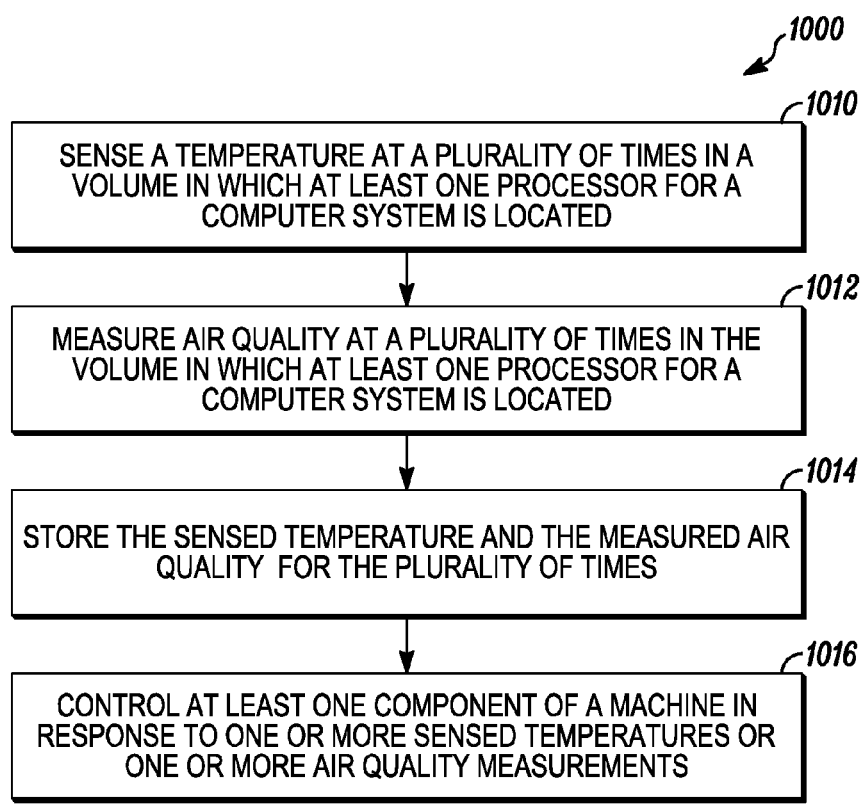
FIG. 10 is a flow diagram of a computerized method, according to an example embodiment.

FIG. 9 is a flow diagram of a method 900 of monitoring, according to an example embodiment. The method 900 of monitoring a computer system for physical maintenance includes sensing the temperature of a portion of a computer system 910, sensing a particle count in an air volume associated with a portion of the computer system 912, and outputting a maintenance indication in response to combinations of sensed temperature and sensed particle count 914. Sensing the temperature of a portion of the computer system 910 includes sensing the temperature of at least one processor of the computer. Processors made by Intel® Corporation of San Jose, Calif., for example, include a temperature sensor associated with the processor. The temperature sensor, in some Intel® Processors is on the northbridge, or a bus associated with the processor that various input/output devices are attached to. The temperature sensor produces an interrupt to the processor if it gets above a certain threshold amount.

In one embodiment, sensing a particle count in the air volume associated with a portion of the computer system 912 includes using a laser light source. A maintenance indication is output 914 when the particle count is above a particle count threshold value.

In another embodiment, the sensed temperature and the sensed particle count is stored at a first time and the sensed temperature and the sensed particle count is stored at a second time. A maintenance indication 916 can be output when the particle count is above a particle count threshold value. A maintenance indication can also be output when the temperature is above a temperature threshold value. Maintenance indications can also be output for various combinations of sensed temperature and sensed particle counts. The output of a maintenance indication includes enabling at least one visible light, or displaying information related to a maintenance indication on a monitor, such as a computer monitor coupled to a host computer or a server networked with the host computer. The sensed temperature and the sensed particle count can also be used to trigger control of other components associated with the computer. For example, the sensed temperature and the sensed particle count can be used to control a fan for moving air through the portion of the computer system. For example, when the particle count is below a certain threshold and the temperature is below a certain threshold, the fan speed can be lowered. This conserves energy. The computer also generates less noise.

A computerized method 1000 includes sensing a temperature at a plurality of times in a volume in which at least one processor for a computer system is located 1010, measuring air quality at a plurality of times in the volume in which at least one processor for a computer system is located 1012, storing the sensed temperature and the measured air quality for the plurality of times 1014, and controlling at least one component of a machine in response to one or more sensed temperatures or one or more air quality measurements 1016. For example, the machine includes a fan. The fan is controlled in response to one or more sensed temperatures. The fan can also be controlled in response to one or more air quality measurements. The stored sensed temperatures and the measured air quality for the plurality of times can also be analyzed to detect a pattern. For example, patterns can include times of low usage or times when the particle count in the air within an enclosure associated with the computer goes up. The pattern can be used as a basis to control at least one component is based in part on the pattern. A fan can be controlled. In another embodiment, a vent associated with an enclosure for the processor can be controlled. For example, if the temperature is higher than normal and the air flow is down despite a high fan speed, the filter might be clogged. In this event, an air vent or bypass could be opened to bypass the filter and cool the computer. It should be noted that a group of computers, such as computers connected via a network, can exhibit similar patterns. This can be used to control components within one or more of the group of computers. In addition, items outside the computer may be controlled in response to a recognized pattern. For example, if the computers are electronic gaming machines, the group of electronic gaming machines may be in one area of a floorplan as laid out on a gaming floor. The detected patterns could be used to control the heating ventilation and air conditioning on a casino floor, such as controlling the vents to direct more cooling air to a bank of electronic gaming machines.

The computer system includes a display. A visual indication of maintenance is displayed. The display can be a light, a group of lights, a maintenance screen or a message on a maintenance screen on the computer monitor or the like.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments.

What is claimed:

1. A computerized method for monitoring an electronic gaming system comprising:
   receiving a plurality of temperature sensor measurements for a volume in which at least one processor for an electronic gaming system is located;
   receiving a plurality of air quality measurements for the volume in which the at least one processor for the electronic gaming system is located;
   storing the received temperature measurements and the received air quality measurements; and
   controlling at least one component of the electronic gaming system in response to one or more of the plurality of temperature measurements or one or more of the plurality of air quality measurements;
   wherein the at least one component includes a fan, the fan being controlled in response to one or more of the plurality of temperature measurements.

2. The computerized method of claim 1 wherein the electronic gaming system includes a display, and wherein the display produces a visual indication of maintenance based on at least one of the air quality measurements.

3. The computerized method of claim 2 wherein the display is a light.

4. The computerized method of claim 2 wherein the display is a monitor.

5. A computerized method for monitoring an electronic gaming system comprising:

receiving a plurality of temperature sensor measurements for a volume in which at least one processor for an electronic gaming system is located;

receiving a plurality of air quality measurements for the volume in which the at least one processor for the electronic gaming system is located;

storing the received temperature measurements and the received air quality measurements; and controlling at least one component of the electronic gaming system in response to one or more of the plurality of temperature measurements or one or more of the plurality of air quality measurements;

wherein the at least one component includes a fan, the fan being controlled in response to one or more of the plurality of air quality measurements.

6. The computerized method of claim 5 wherein the electronic gaming system includes a display, and wherein the display produces a visual indication of maintenance based on at least one of the air quality measurements.

7. The computerized method of claim 6 wherein the display is a light.

8. The computerized method of claim 6 wherein the display is a monitor.

9. A computerized method for monitoring an electronic gaming system comprising:

receiving a plurality of temperature sensor measurements for a volume in which at least one processor for an electronic gaming system is located;

receiving a plurality of air quality measurements for the volume in which the at least one processor for the electronic gaming system is located;

storing the received temperature measurements and the received air quality measurements; and controlling at least one component of the electronic gaming system in response to one or more of the plurality of temperature measurements or one or more of the plurality of air quality measurements;

wherein the stored temperature measurements and the stored air quality measurements are analyzed for a pattern, and wherein controlling the at least one component is based in part on the pattern.

10. The computerized method of claim 9 wherein the electronic gaming system includes a display, and wherein the display produces a visual indication of maintenance based on at least one of the air quality measurements.

11. The computerized method of claim 10 wherein the display is a light.

12. The computerized method of claim 10 wherein the display is a monitor.

* * * * *

UNITED STATES PATENT AND TRADEMARK OFFICE
CERTIFICATE OF CORRECTION

| | | |
|---|---|---|
| PATENT NO. | : 8,777,758 B2 | Page 1 of 1 |
| APPLICATION NO. | : 13/287879 | |
| DATED | : July 15, 2014 | |
| INVENTOR(S) | : Nicholas William Anderson et al. | |

It is certified that error appears in the above-identified patent and that said Letters Patent is hereby corrected as shown below:

IN THE CLAIMS

In Claim 1, Column 12, Line 44, replace "an" with --the--.
In Claim 1, Column 12, Line 49, between "temperature" and "measurements" insert --sensor--.
In Claim 1, Column 12, Line 53, between "temperature" and "measurements" insert --sensor--.
In Claim 1, Column 12, Line 57, between "temperature" and "measurements" insert --sensor--.
In Claim 5, Column 13, Line 2, replace "an" with --the--.
In Claim 5, Column 13, Line 7, between "temperature" and "measurements" insert --sensor--.
In Claim 5, Column 13, Line 11, between "temperature" and "measurements" insert --sensor--.
In Claim 9, Column 14, Line 2, replace "an" with --the--.
In Claim 9, Column 14, Line 7, between "temperature" and "measurements" insert --sensor--.
In Claim 9, Column 14, Line 11, between "temperature" and "measurements" insert --sensor--.
In Claim 9, Column 14, Line 13, between "temperature" and "measurements" insert --sensor--.

Signed and Sealed this
Twenty-first Day of July, 2015

Michelle K. Lee
*Director of the United States Patent and Trademark Office*